United States Patent
Ito et al.

(10) Patent No.: US 8,795,544 B2
(45) Date of Patent: Aug. 5, 2014

(54) POWER STORAGE DEVICE, LITHIUM-ION SECONDARY BATTERY, ELECTRIC DOUBLE LAYER CAPACITOR AND LITHIUM-ION CAPACITOR

(75) Inventors: Kyosuke Ito, Kanagawa (JP); Toru Itakura, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 331 days.

(21) Appl. No.: 13/167,030

(22) Filed: Jun. 23, 2011

(65) Prior Publication Data

US 2012/0002349 A1  Jan. 5, 2012

(30) Foreign Application Priority Data

Jun. 30, 2010  (JP) ................. 2010-149169

(51) Int. Cl.
*H01M 10/0561* (2010.01)
*H01M 10/0563* (2010.01)

(52) U.S. Cl.
USPC .......... 252/62.2; 361/503; 361/502; 361/505; 429/339; 429/324

(58) Field of Classification Search
USPC .......... 252/62.2; 361/503, 502, 505; 429/339, 429/324
See application file for complete search history.

(56) References Cited

U.S. PATENT DOCUMENTS

| | | | |
|---|---|---|---|
| 7,297,289 B2 | 11/2007 | Sato et al. | |
| 2007/0099079 A1 | 5/2007 | Matsumoto et al. | |
| 2007/0099090 A1 | 5/2007 | Oh et al. | |
| 2008/0296531 A1* | 12/2008 | Whiston et al. | ............ 252/182.3 |
| 2011/0070486 A1 | 3/2011 | Matsumoto et al. | |
| 2012/0021279 A1* | 1/2012 | Le Bideau et al. | ............ 429/189 |

FOREIGN PATENT DOCUMENTS

| | | | |
|---|---|---|---|
| JP | 2003-331918 | * | 11/2003 |
| WO | WO 2009/003224 | * | 1/2009 |
| WO | WO 2010/092258 | * | 8/2010 |

OTHER PUBLICATIONS

Sakaebe.H et al., "N-Methyl-N-propylpiperidinium bis(trifluoromethanesulfonyl)imide (PP13-TFSI)—novel electrolyte base for Li battery", Electrochemistry Communications, Jul. 1, 2003, vol. 5, No. 7, pp. 594-598.

Matsumoto.H et al., "Fast cycling of Li/LiCoO2 cell with low-viscosity ionic liquids based on bis (fluorosulfonyl)imide [FSI]", Journal of Power Sources, Mar. 22, 2006, vol. 160, No. 2, pp. 1308-1313, Elsevier science direct.

MacFarlane.D et al., "Pyrrolidinium Imides: A New Family of Molten Salts and Conductive Plastic Crystal Phases", J. Phys. Chem. B (Journal of Physical Chemistry B), Feb. 2, 1999, vol. 103, No. 20, pp. 4164-4170.

* cited by examiner

*Primary Examiner* — Carol M Koslow
(74) *Attorney, Agent, or Firm* — Nixon Peabody LLP; Jeffrey L. Costellia

(57) ABSTRACT

One object is to provide a power storage device including an electrolyte using a room-temperature ionic liquid which includes a univalent anion and a cyclic quaternary ammonium cation having excellent reduction resistance. Another object is to provide a high-performance power storage device. A room-temperature ionic liquid which includes a cyclic quaternary ammonium cation represented by a general formula (G1) below is used for an electrolyte of a power storage device. In the general formula (G1), one or two of $R_1$ to $R_5$ are any of an alkyl group having 1 to 20 carbon atoms, a methoxy group, a methoxymethyl group, and a methoxyethyl group. The other three or four of $R_1$ to $R_5$ are hydrogen atoms. $A^-$ is a univalent imide anion, a univalent methide anion, a perfluoroalkyl sulfonic acid anion, tetrafluoroborate ($BF_4^-$), or hexafluorophosphate ($PF_6^-$).

12 Claims, 11 Drawing Sheets

POWER STORAGE DEVICE, LITHIUM-ION SECONDARY BATTERY, ELECTRIC DOUBLE LAYER CAPACITOR AND LITHIUM-ION CAPACITOR

BACKGROUND OF THE INVENTION

1. Field of the Invention

The present invention relates to a room-temperature ionic liquid and a power storage device using the room-temperature ionic liquid.

Note that the power storage device indicates all elements and devices which have a function of storing power.

2. Description of the Related Art

A lithium-ion secondary battery which is one of power storage devices is used in a variety of applications including mobile phones, electric vehicles (EV), and the like. Characteristics such as high energy density, cycle characteristics, and safety under various operating environments are required for a lithium-ion secondary battery.

As an organic solvent for an electrolyte of a lithium-ion secondary battery, a cyclic carbonate which has high dielectric constant and excellent ion conductivity is often used. Among the cyclic carbonate, ethylene carbonate is often used.

However, not only ethylene carbonate but many organic solvents have volatility and a low flash point. For this reason, in the case where an organic solvent is used for an electrolyte of a lithium-ion secondary battery, the temperature inside the lithium-ion secondary battery might rise due to a short circuit, overcharge, or the like and the lithium-ion secondary battery might burst or catch fire.

In view of the above, it has been considered to use a room-temperature ionic liquid which is less likely to burn and volatilize as an electrolyte of a lithium-ion secondary battery.

REFERENCE

Patent Document

[Patent Document 1] Japanese Published Patent Application No. 2003-331918

SUMMARY OF THE INVENTION

When a room-temperature ionic liquid is used for an electrolyte of a lithium-ion secondary battery, there is a problem in that a low potential negative electrode material cannot be used because of low reduction resistance of a room-temperature ionic liquid. Thus, a technique has been disclosed, which enables dissolution and precipitation of lithium which is a low potential negative electrode material without an additive by improving the reduction resistance of a room-temperature ionic liquid using quaternary ammonium salt (see Patent Document 1). However, the reduction potential of a room-temperature ionic liquid whose reduction resistance is thus improved is substantially equivalent to an oxidation-reduction potential of lithium. Further improvement is required for the reduction resistance of a room-temperature ionic liquid.

In view of the above problem, one object of the present invention is to provide a power storage device including an electrolyte using a room-temperature ionic liquid which is excellent in reduction resistance. Another object is to provide a high-performance power storage device.

One embodiment of the present invention is a power storage device including a room-temperature ionic liquid represented by a general formula (G1) below, which includes a cyclic quaternary ammonium cation.

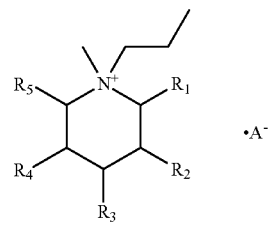

(G1)

In the general formula (G1), one or two of $R_1$ to $R_5$ are any of an alkyl group having 1 to 20 carbon atoms, a methoxy group, a methoxymethyl group, and a methoxyethyl group; the other three or four of $R_1$ to $R_5$ are hydrogen atoms; and $A^-$ is a univalent imide anion, a univalent methide anion, a perfluoroalkyl sulfonic acid anion, tetrafluoroborate ($BF_4^-$), or hexafluorophosphate ($PF_6^-$).

Specifically, one or two of $R_1$ to $R_5$ in the room-temperature ionic liquid represented by the general formula (G1) are preferably an alkyl group having 1 to 4 carbon atoms.

Another embodiment of the present invention is a power storage device including an electrolyte using a room-temperature ionic liquid represented by a general formula (G2) below, which includes a cyclic quaternary ammonium cation.

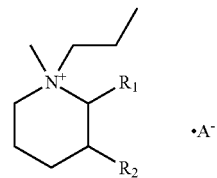

(G2)

In the general formula (G2), one of $R_1$ and $R_2$ is any of an alkyl group having 1 to 20 carbon atoms, a methoxy group, a methoxymethyl group, and a methoxyethyl group; the other of $R_1$ and $R_2$ is a hydrogen atom; and $A^-$ is a univalent imide anion, a univalent methide anion, a perfluoroalkyl sulfonic acid anion, tetrafluoroborate ($BF_4^-$) or hexafluorophosphate ($PF_6^-$).

Another embodiment of the present invention is a power storage device including an electrolyte using the room-temperature ionic liquid represented by the general formula (G2), in which one of $R_1$ and $R_2$ is an alkyl group having 1 to 4 carbon atoms.

Another embodiment of the present invention is a power storage device including an electrolyte using a room-temperature ionic liquid represented by a general formula (G3) below, which includes a cyclic quaternary ammonium cation.

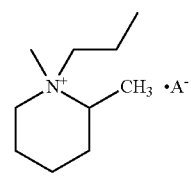

(G3)

In the general formula (G3), $A^-$ is a univalent imide anion, a univalent methide anion, a perfluoroalkyl sulfonic acid anion, tetrafluoroborate ($BF_4^-$), or hexafluorophosphate ($PF_6^-$).

Another embodiment of the present invention is a power storage device including an electrolyte using a room-temperature ionic liquid represented by a general formula (G4) below, which includes a cyclic quaternary ammonium cation.

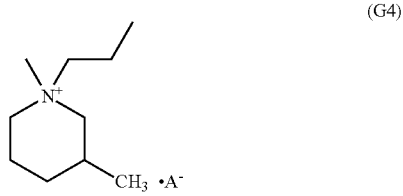

(G4)

In the general formula (G4), $A^-$ is a univalent imide anion, a univalent methide anion, a perfluoroalkyl sulfonic acid anion, tetrafluoroborate ($BF_4^-$), or hexafluorophosphate ($PF_6^-$).

Another embodiment of the present invention is a power storage device including an electrolyte using a room-temperature ionic liquid which includes any one of univalent anions selected from $(C_nF_{2n+1}SO_2)_2N^-$ (n=0 to 4), $(C_mF_{2m+1}SO_3)^-$ (m=0 to 4), and $CF_2(CF_2SO_2)_2N^-$ for $A^-$ in the general formulae (G1) to (G4).

Another embodiment of the present invention is a lithium-ion secondary battery at least including a positive electrode, a negative electrode, any one of the room-temperature ionic liquids represented by the general formulae (G1) to (G4), and electrolyte salt including lithium. Any one of the room-temperature ionic liquids represented by the general formulae (G1) to (G4) and the electrolyte salt including lithium are included in an electrolyte.

Another embodiment of the present invention is an electric double layer capacitor at least including a positive electrode, a negative electrode, and any one of the room-temperature ionic liquids represented by the general formulae (G1) to (G4) which is used for an electrolyte.

Another embodiment of the present invention is a lithium-ion capacitor at least including a positive electrode, a negative electrode, any one of the room-temperature ionic liquids represented by the general formulae (G1) to (G4), and electrolyte salt including lithium. Any one of the room-temperature ionic liquids represented by the general formulae (G1) to (G4) and the electrolyte salt including lithium are included in an electrolyte.

According to one embodiment of the present invention, a power storage device including an electrolyte using a room-temperature ionic liquid which is excellent in reduction resistance can be provided. Further, a high-performance power storage device can be provided.

DETAILED DESCRIPTION OF THE INVENTION

Figure 1A:
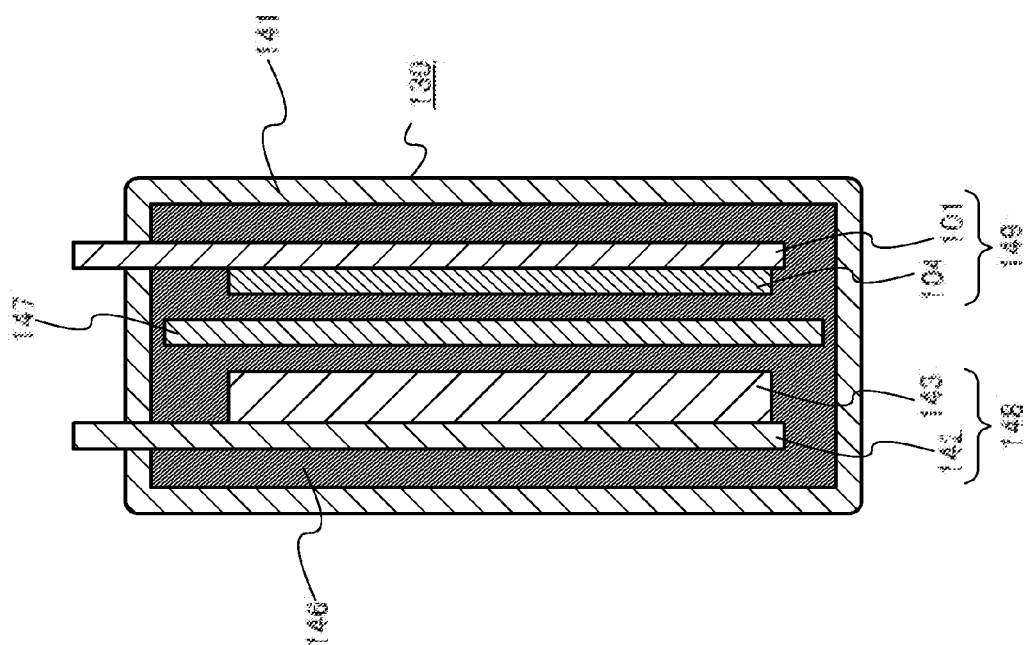
FIGS. 1A and 1B are cross-sectional views of lithium-ion secondary batteries.

Hereinafter embodiments of the present invention will be described in detail with reference to the accompanying drawings. Note that the present invention is not limited to the following description and it is easily understood by those skilled in the art that the mode and details can be variously changed without departing from the scope and spirit of the present invention. Therefore the invention should not be construed as being limited to the description of the embodiment below. In describing structures of the present invention with reference to the drawings, the same reference numerals are used in common for the same portions in different drawings. The same hatching pattern is applied to similar parts, and the similar parts are not especially denoted by reference numerals in some cases. In addition, an insulating layer is not illustrated in a top view for convenience in some cases. Note that the size, the layer thickness, or the region of each structure shown in each drawing is exaggerated for clarity in some cases. Consequently, the present invention is not necessarily limited to such scales shown in the drawings.

Embodiment 1

In this embodiment, an electrolyte of a power storage device which is one embodiment of the present invention, and a room-temperature ionic liquid which is used for the electrolyte, which is one embodiment of the present invention, will be described.

A room-temperature ionic liquid of one embodiment of the present invention includes a cyclic quaternary ammonium cation and a univalent anion. The room-temperature ionic liquid can be represented by a general formula (G1) below.

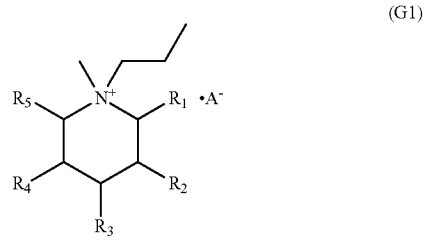

(G1)

In the general formula (G1), one or two of $R_1$ to $R_5$ are any of an alkyl group having 1 to 20 carbon atoms, a methoxy group, a methoxymethyl group, and a methoxyethyl group.

The other three or four of $R_1$ to $R_5$ are hydrogen atoms. $A^-$ is a univalent imide anion, a univalent methide anion, a perfluoroalkyl sulfonic acid anion, tetrafluoroborate ($BF_4^-$), or hexafluorophosphate ($PF_6^-$).

In the case where $R_1$ to $R_5$ in the general formula (G1) are an alkyl group having 1 to 20 carbon atoms, carbon atoms having small carbon number (for example, 1 to 4 carbon atoms) is used because the viscosity of the synthesized room-temperature ionic liquid can be reduced; which is preferable for a power storage device.

When a room-temperature ionic liquid having low reduction resistance (also referred to as stability against reduction) is used for an electrolyte of a power storage device, the room-temperature ionic liquid is reduced by receiving electrons from a positive electrode material or a negative electrode material and therefore decomposed. Characteristics of the power storage device deteriorate as a result.

"Reduction of a room-temperature ionic liquid" means that a room-temperature ionic liquid receives electrons from a positive electrode material or a negative electrode material. Thus, the stability against reduction can be improved by making it difficult particularly for a cation having a positive charge, which is included in the room-temperature ionic liquid, to receive electrons, i.e., lowering the reduction potential of the room-temperature ionic liquid.

Inductive effects are caused by an electron donating substituent included in the room-temperature ionic liquids of embodiments of the present invention. In the room-temperature ionic liquid, electric polarization of a cation which is an ion having a positive charge is alleviated due to inductive effects, so that it is difficult for the cation to receive electrons. Consequently, the reduction resistance of the room-temperature ionic liquid is improved.

As described above, the electron donating substituent can be any one of an alkyl group having 1 to 20 carbon atoms, a methoxy group, a methoxymethyl group, and a methoxyethyl group. The alkyl group having 1 to 20 carbon atoms may be either a straight-chain alkyl group or a branched-chain alkyl group.

The reduction potential of the room-temperature ionic liquid can be lowered and the reduction resistance of the room-temperature ionic liquid can be improved even when the general formula (G1) includes either one or two electron donating substituents.

A room-temperature ionic liquid of one embodiment of the present invention includes a cyclic quaternary ammonium cation and a univalent anion. The room-temperature ionic liquid can be represented by a general formula (G2) below.

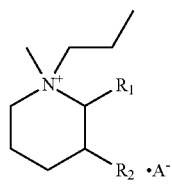

(G2)

One of $R_1$ and $R_2$ in the general formula (G2) is any one of an alkyl group having 1 to 20 carbon atoms, a methoxy group, a methoxymethyl group, and a methoxyethyl group. The other of $R_1$ and $R_2$ is a hydrogen atom. $A^-$ is a univalent imide anion, a univalent methide anion, a perfluoroalkyl sulfonic acid anion, $BF_4^-$, or $PF_6^-$.

It is preferable to use a carbon atom having small carbon number for an alkyl group in the general formula (G2) as in the general formula (G1) because a cyclic quaternary ammonium cation can be easily synthesized.

In the general formula (G2), $R_3$ to $R_5$ of the general formula (G1) are hydrogen atoms, so that the general formula (G2) is a room-temperature ionic liquid whose reduction resistance is improved.

Further, one embodiment of the present invention is a room-temperature ionic liquid including a methyl group as $R_1$ and a hydrogen atom as $R_2$ in the general formula (G2). The room-temperature ionic liquid can be represented by a general formula (G3) below. $A^-$ is any one of a univalent imide anion, a univalent methide anion, a perfluoroalkyl sulfonic acid anion, $BF_4^-$, and $PF_6^-$.

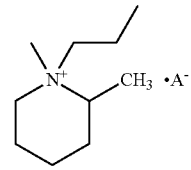

(G3)

Furthermore, one embodiment of the present invention is a room-temperature ionic liquid including a hydrogen atom as $R_1$ and a methyl group as $R_2$ in the general formula (G2). The room-temperature ionic liquid can be represented by a general formula (G4) below. $A^-$ is any one of a univalent imide anion, a univalent methide anion, a perfluoroalkyl sulfonic acid anion, $BF_4^-$, and $PF_6^-$.

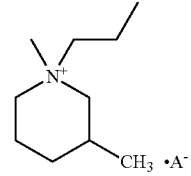

(G4)

The general formulae (G3) and (G4) are room-temperature ionic liquids based on the general formula (G2) and further based on the general formula (G1). Therefore, the general formulae (G3) and (G4) are room-temperature ionic liquids whose reduction resistance is improved.

Further, $A^-$ in the general formulae (G1) to (G4) is any one of a univalent imide anion, a univalent methide anion, a perfluoroalkyl sulfonic acid anion, $BF_4^-$, and $PF_6^-$; however, $A^-$ is not limited to this. Any anion may be used as $A^-$ as long as it serves as a room-temperature ionic liquid with a cyclic quaternary ammonium cation of one embodiment of the present invention.

Here, calculation results of an improvement of the reduction resistance caused by an electron donating substituent are shown.

A lowest unoccupied molecular orbital level (LUMO level) of a cation in each of six kinds of room-temperature ionic liquids determined by a quantum chemistry computational program is shown in Table 1. The six kinds of room-temperature ionic liquids each include a methyl group as substituents of $R_1$ to $R_5$ in the general formula (G1). The six kinds of room-temperature ionic liquids are represented by structural formulae (α-1) to (α-8) below. In addition, as a comparative example, a lowest unoccupied molecular orbital level (LUMO level) of a (N-methyl-N-propylpiperidinium) cation represented by a structural formula (α-9) below is shown in the Table 1. A (N-methyl-N-propylpiperidinium) cation is a room-temperature ionic liquid having a reduction potential which is the same degree as that of an oxidation-reduction potential of lithium which is used as a negative electrode of a power storage device.

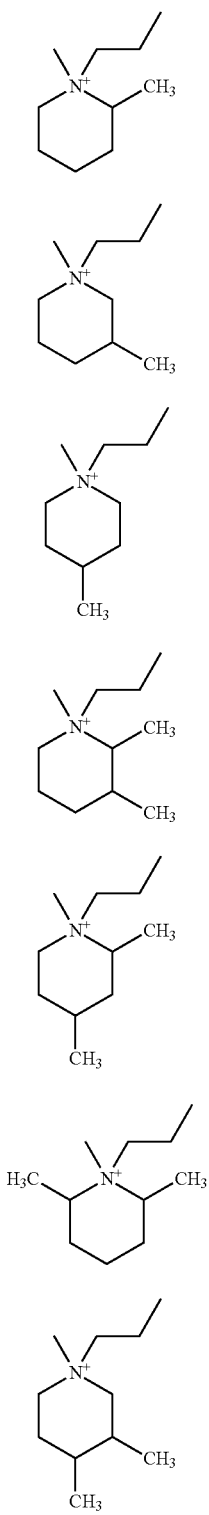

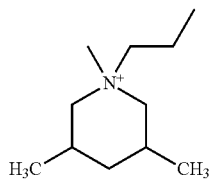

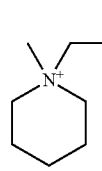

TABLE 1

| | LUMO Level |
|---|---|
| Structural Formula (α-1) | −3.047 [eV] |
| Structural Formula (α-2) | −3.174 [eV] |
| Structural Formula (α-3) | −3.192 [eV] |
| Structural Formula (α-4) | −2.941 [eV] |
| Structural Formula (α-5) | −3.013 [eV] |
| Structural Formula (α-6) | −2.877 [eV] |
| Structural Formula (α-7) | −3.125 [eV] |
| Structural Formula (α-8) | −3.102 [eV] |
| Structural Formula (α-9) | −3.244 [eV] |

In the quantum chemistry computation of this embodiment, the optimal molecular structures in the ground state and a triplet state of a cation in each of the room-temperature ionic liquids of embodiments of the present invention and a (N-methyl-N-propylpiperidinium) cation are calculated by using the density functional theory (DFT). The total energy of the DFT is represented as the sum of potential energy, electrostatic energy between electrons, electronic kinetic energy, and exchange-correlation energy including all the complicated interactions between electrons. Also in the DFT, an exchange-correlation interaction is approximated by a functional (a function of another function) of one electron potential represented in terms of electron density to enable high-speed and highly-accurate calculations. Here, B3LYP, which is a hybrid functional, is used to specify the weight of each parameter related to exchange-correlation energy. In addition, as a basis function, 6-311 (a basis function of a triple-split valence basis set using three contraction functions for each valence orbital) is applied to all the atoms. By the above basis function, for example, orbits of 1s to 3s are considered in the case of hydrogen atoms while orbits of 1s to 4s and 2p to 4p are considered in the case of carbon atoms. Furthermore, to improve calculation accuracy, the p function and the d function as polarization basis sets are added to hydrogen atoms and atoms other than hydrogen atoms respectively.

Note that Gaussian 09 is used as the quantum chemistry computational program. A high performance computer (Altix 4700, manufactured by SGI Japan, Ltd.) is used for the calculations. The quantum chemistry computation is performed assuming that all of the cations represented by the structural formulae (α-1) to (α-9) have the most stable structure and are in a vacuum.

In the case where a room-temperature ionic liquid is used for an electrolyte of a power storage device, the reduction resistance of the room-temperature ionic liquid results in the degree of electrons received from a positive electrode or a negative electrode by a cation included in the room-temperature ionic liquid, as described above.

For example, when the LUMO level of a cation is higher than a conduction band of a negative electrode material, a room-temperature ionic liquid including the cation is not reduced. The reduction resistance of the cation with respect to lithium can be evaluated by comparing the LUMO level of the cation with the LUMO level of a (N-methyl-N-propylpiperidinium) cation having a reduction potential substantially equivalent to an oxidation-reduction potential of lithium that is a typical low potential negative electrode material. In other words, it can be said that when the LUMO level of a cation in the room-temperature ionic liquids of embodiments of the present invention is higher than the LUMO level of a (N-methyl-N-propylpiperidinium) cation, the room-temperature ionic liquids of embodiments of the present invention are excellent in reduction resistance.

From Table 1, the LUMO level of the cation represented by the structural formula ($\alpha$-1) is −3.047 eV; the LUMO level of the cation represented by the structural formula ($\alpha$-2) is −3.174 eV; the LUMO level of the cation represented by the structural formula ($\alpha$-3) is −3.192 eV; the LUMO level of the cation represented by the structural formula ($\alpha$-4) is −2.941 eV; the LUMO level of the cation represented by the structural formula ($\alpha$-5) is −3.013 eV; the LUMO level of the cation represented by the structural formula ($\alpha$-6) is −2.877 eV; the LUMO level of the cation represented by the structural formula ($\alpha$-7) is −3.125 eV; and the LUMO level of the cation represented by the structural formula ($\alpha$-8) is −3.102 eV.

The LUMO level of the (N-methyl-N-propylpiperidinium) cation that is a comparative example represented by the structural formula ($\alpha$-9) is −3.244 eV. The LUMO levels of all of the cations in the room-temperature ionic liquids of embodiments of the present invention are higher than −3.244 eV. Therefore, the room-temperature ionic liquids of embodiments of the present invention are excellent in the reduction resistance.

That is, reduction resistance of a room-temperature ionic liquid is improved by an advantageous effect of introducing an electron donating substituent into a molecule.

The oxidation potential of a room-temperature ionic liquid changes depending on anion species. When any one of $(C_nF_{2n+1}SO_2)_2N^-$ (n=0 to 4), $(C_mF_{2m+1}SO_3)^-$ (m=0 to 4), and $CF_2(CF_2SO_2)_2N^-$ is used as a univalent anion of the room-temperature ionic liquids of embodiments of the present invention, the oxidation potential can be high. When the oxidation potential is high, it means that the oxidation resistance (also referred to as stability against oxidation) is improved. The oxidation resistance of the room-temperature ionic liquids of embodiments of the present invention is improved by the interaction between a cation in which electric polarization is alleviated because of an electron donating substituent and the anion described above.

An electrolyte of a power storage device having low reduction potential and high oxidation potential, that is, a wide oxidation-reduction potential window can increase the number of materials which can be selected for a positive electrode and a negative electrode and make the electrolyte stable to the selected positive electrode material and negative electrode material. Therefore, a power storage device having excellent reliability can be realized.

The energy density of a power storage device is caused by a difference between an oxidation potential of a positive electrode material and a reduction potential of a negative electrode material. Thus, a low potential negative electrode material and a high potential positive electrode material can be selected by using an electrolyte having wide reduction-oxidation potential window. Consequently, a power storage device having high energy density can be realized.

In this embodiment, the case where $R_1$ to $R_5$ in the general formula (G1) or (G2) are an alkyl group having 1 to 4 carbon atoms is described; however, the number of carbon atoms is not limited to this. The number of carbon atoms may be 1 to 20. For example, the number of carbon atoms can be greater than or equal to 5. The freezing point can be changed by adjusting the number of carbon atoms. By changing the freezing point, a storage device which can be used in a variety of applications can be manufactured.

According to this embodiment, a room-temperature ionic liquid having excellent reduction resistance and oxidation resistance is used for an electrolyte of a power storage device; thus, a high-performance power storage device having high energy density and excellent reliability can be obtained.

This embodiment can be implemented in appropriate combination with any of the structures described in the other embodiments.

Embodiment 2

An electrolyte in a power storage device of one embodiment of the present invention includes a nonaqueous solvent and electrolyte salt. The room-temperature ionic liquid of one embodiment of the present invention can be used for the nonaqueous solvent in which the electrolyte salt dissolves. The electrolyte salt dissolved in the nonaqueous solvent may be electrolyte salt including carrier ions such as an alkali metal ion, an alkaline earth metal ion, a beryllium ion, or a manganese ion. Examples of the alkali metal ion include a lithium ion, a sodium ion, or a potassium ion. Examples of the alkaline earth metal ion include a calcium ion, a strontium ion, or a barium ion. Electrolyte salt including a lithium ion is used as the electrolyte salt of this embodiment. Further, a lithium-ion secondary battery or a lithium-ion capacitor can be formed by using at least a positive electrode, a negative electrode, and a separator. In this structure, an electric double layer capacitor can be obtained by using the room-temperature ionic liquid of one embodiment of the present invention for an electrolyte, without using the electrolyte salt.

In this embodiment, among the above described power storage devices, a lithium-ion secondary battery using an electrolyte which includes a room-temperature ionic liquid and electrolyte salt including lithium and a manufacturing method of the lithium-ion secondary battery are described with reference to FIGS. 1A and 1B.

A structural example of a lithium-ion secondary battery 130 is shown in FIG. 1A.

The lithium-ion secondary battery 130 in this embodiment includes a positive electrode 148 including a positive electrode current collector 142 and a positive electrode active material layer 143, and a negative electrode 149 including a negative electrode current collector 101 and a negative electrode active material layer 104. The lithium-ion secondary battery 130 in FIG. 1A includes a separator 147, a housing 141, and an electrolyte 146. The separator 147 is provided between the positive electrode 148 and the negative electrode 149. The positive electrode 148, the negative electrode 149, and the separator 147 are provided in the housing 141. The electrolyte 146 is included in the housing 141.

For the positive electrode current collector 142, for example, a conductive material can be used. As the conductive material, aluminum (Al), copper (Cu), nickel (Ni), or titanium (Ti) can be used, for example. In addition, an alloy material containing two or more of the above-mentioned conductive materials can be used as the positive electrode current collector 142. As the alloy material, an Al—Ni alloy or an Al—Cu alloy can be used, for example. Furthermore, a conductive layer provided by deposition separately on a substrate and then separated from the substrate can be also used as the positive electrode current collector 142.

As the positive electrode active material layer 143, a material containing ions serving as carriers and a transition metal can be used, for example. As the material containing ions serving as carriers and a transition metal, a material represented by a general formula $A_hM_iPO_j$ (h>0, i>0, j>0) can be used, for example. Here, A represents, for example, an alkaline metal such as lithium, sodium, or potassium; or an alkaline earth metal such as calcium, strontium, or barium; beryllium; or magnesium. M indicates a transition metal such as iron, nickel, manganese, or cobalt. As the material represented by the general formula $A_hM_iPO_j$ (h>0, i>0, j>0), lithium iron phosphate, sodium iron phosphate, or the like can be given. The material represented by A and the material represented by M may be selected from one or more of each of the above materials.

Alternatively, a material represented by a general formula $A_hM_iO_j$ (h>0, i>0, j>0) can be used. Here, A represents, for example, an alkaline metal such as lithium, sodium, or potassium; or an alkaline earth metal such as calcium, strontium, or barium; beryllium; or magnesium. M indicates a transition metal such as iron, nickel, manganese, or cobalt. As the material represented by the general formula $A_hM_iO_j$ (h>0, i>0, j>0), lithium cobaltate, lithium manganate, lithium nickel oxide, or the like can be given. The material represented by A and the material represented by M may be selected from one or more of each of the above materials.

A material containing lithium is preferably selected for the positive electrode active material layer 143 of the lithium-ion secondary battery in this embodiment. In other words, A in the above general formulae $A_hM_iPO_j$ (h>0, i>0, j>0) or $A_hM_iO_j$ (h>0, i>0, j>0) is preferably lithium.

The positive electrode active material layer 143 may be formed by applying a paste mixed with a conductive additive (for example, acetylene black (AB) or a binder (for example, polyvinylidene fluoride (PVDF))) onto the positive electrode current collector 142, or formed by sputtering. In the case of forming the positive electrode active material layer 143 by a coating method, pressure forming may also be employed, if necessary.

Note that strictly speaking, "active material" refers only to a material that relates to insertion and elimination of ions functioning as carriers. In this specification, however, in the case of using a coating method to form the positive electrode active material layer 143, for the sake of convenience, the positive electrode active material layer 143 collectively refers to the material of the positive electrode active material layer 143, that is, a substance that is actually a "positive electrode active material," a conductive additive, a binder, etc.

For the negative electrode current collector 101, a simple substance of copper (Cu), aluminum (Al), nickel (Ni), or titanium (Ti), or a compound of any of these elements can be used.

There is no particular limitation on a material used for the negative electrode active material layer 104 as long as it can dissolve and precipitate lithium and can be doped and dedoped with a lithium ion. For example, a lithium metal, a carbon based material, silicon, a silicon alloy, or tin can be used. For carbon to/from which a lithium ion can be inserted and extracted, graphite based carbon such as a fine graphite powder, a graphite fiber, or graphite can be used.

For a nonaqueous solvent of the electrolyte 146, the room-temperature ionic liquids described in Embodiment 1 can be used. For electrolyte salt of the electrolyte 146, electrolyte salt including lithium can be used. Further, the nonaqueous solvent of the electrolyte 146 in which the electrolyte salt dissolves is not necessarily a single solvent of the room-temperature ionic liquids described in Embodiment 1. The nonaqueous solvent may be a mixed solvent of plural kinds of solvents in which any one of the room-temperature ionic liquids described in Embodiment 1 and another room-temperature ionic liquid are mixed.

Examples of the electrolyte salt including lithium include lithium chloride (LiCl), lithium fluoride (LiF), lithium perchlorate (LiClO$_4$), lithium fluoroborate (LiBF$_4$), LiAsF$_6$, LiPF$_6$, Li(CF$_3$SO$_2$)$_2$N, and the like. The electrolyte salt dissolved in the nonaqueous solvent of the room-temperature ionic liquids described in Embodiment 1 may be electrolyte salt which includes a carrier ion and corresponds with the positive electrode active material layer 143. In this embodiment, the electrolyte salt including lithium is used as the electrolyte salt because lithium is contained in the material used for the positive electrode active material layer 143. However, it is preferable to use electrolyte salt including sodium as the electrolyte salt when a material containing sodium is used for the positive electrode active material layer 143, for example.

As the separator 147, paper, nonwoven fabric, a glass fiber, a synthetic fiber such as nylon (polyimide), vinylon (a polyvinyl alcohol based fiber), polyester, acrylic, polyolefin, or polyurethane, or the like may be used. Note that a material which does not dissolve in the electrolyte should be selected.

More specific examples of the materials for the separator 147 are high-molecular compounds based on fluorine-based polymer, polyether such as polyethylene oxide and polypropylene oxide, polyolefin such as polyethylene and polypropylene, polyacrylonitrile, polyvinylidene chloride, polymethyl methacrylate, polymethylacrylate, polyvinyl alcohol, polymethacrylonitrile, polyvinyl acetate, polyvinylpyrrolidone, polyethyleneimine, polybutadiene, polystyrene, polyisoprene, and polyurethane; derivatives thereof; cellulose; paper; and nonwoven fabric, all of which can be used either alone or in a combination.

Next, a lithium-ion secondary battery 131 having a different structure from that in FIG. 1A will be described with reference to FIG. 1B. The lithium-ion secondary battery 131 shown in FIG. 1B includes the positive electrode 148 including the positive electrode current collector 142 and the positive electrode active material layer 143, and the negative electrode 149 including the negative electrode current collector 101 and the negative electrode active material layer 104. In the lithium-ion secondary battery, a separator 156 is provided between the positive electrode 148 and the negative electrode 149 and is impregnated with an electrolyte.

Figure 1B:
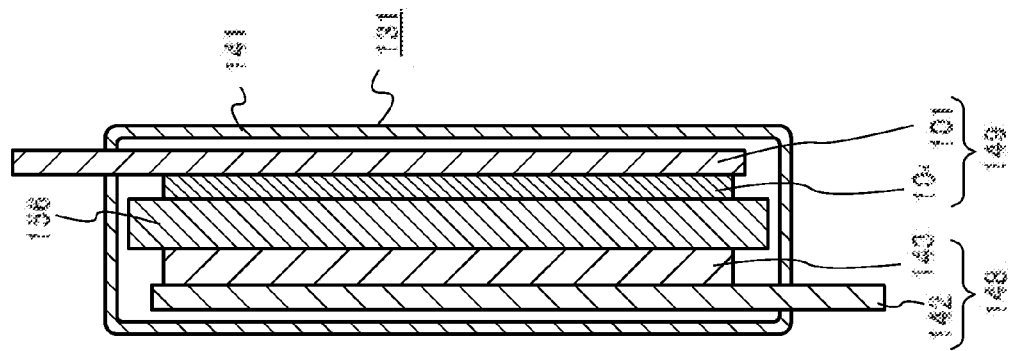

The components shown in the lithium-ion secondary battery 130 can be used as the negative electrode current collector 101, the negative electrode active material layer 104, the positive electrode current collector 142, and the positive electrode active material layer 143, which are in FIG. 1B.

The separator 156 is preferably a porous film. As a material of the porous film, a glass fiber, a synthetic resin material, a ceramic material, or the like may be used.

As the electrolyte with which the separator 156 is impregnated, the electrolyte in the lithium-ion secondary battery 130 can be used.

<Method for Manufacturing Lithium-Ion Secondary Battery>

Here, a method for manufacturing the positive electrode 148 including the positive electrode active material layer 143 on the positive electrode current collector 142 will be described.

For the material of each of the positive electrode current collector 142 and the positive electrode active material layer 143, the above described materials can be used.

Then, the positive electrode active material layer 143 is formed on the positive electrode current collector 142. The positive electrode active material layer 143 may be formed by a sputtering method or a coating method as described above. In the case of forming the positive electrode active material layer 143 by a coating method, the material for the positive electrode active material layer 143 is mixed with a conduction auxiliary agent, a binder, etc. to form a paste, and the paste is applied onto the positive electrode current collector 142 and dried to form the positive electrode active material layer 143. In the case of forming the positive electrode active material layer 143 by a coating method, pressure forming may be employed, if necessary. As described above, the positive electrode 148 includes the positive electrode active material layer 143 formed on the positive electrode current collector 142.

Note that as the conduction auxiliary agent, an electron-conductive material which does not cause chemical change in the power storage device may be used. For example, a carbon material such as graphite or carbon fibers; a metal material such as copper, nickel, aluminum, or silver; or a powder or a fiber of a mixture thereof can be used.

Note that as the binder, a polysaccharide, a thermoplastic resin, a polymer with rubber elasticity, or the like such as starch, polyvinyl alcohol, carboxymethyl cellulose, hydroxypropyl cellulose, regenerated cellulose, or diacetyl cellulose, polyvinyl chloride, polyvinyl pyrrolidone, polytetrafluoroethylene, polyvinylide fluoride, polyethylene, or polypropylene, ethylene-propylene-diene monomer (EPDM), sulfonated EPDM, styrene-butadiene rubber, butadiene rubber, fluorine rubber, or polyethylene oxide can be given.

Next, a method for manufacturing the negative electrode 149 including the negative electrode current collector 101 and the negative electrode active material layer 104 will be described.

For the material of each of the negative electrode current collector 101 and the negative electrode active material layer 104, the above described materials can be used.

Next, the negative electrode active material layer 104 is formed on the negative electrode current collector 101. In this embodiment a lithium foil is used. The room-temperature ionic liquid of one embodiment of the present invention is excellent in reduction resistance and is stable to lithium which is a negative electrode material having the lowest potential. Consequently, when the room-temperature ionic liquid is used for the electrolyte, the lithium-ion secondary batteries 130 and 131 which have high energy density and excellent reliability can be obtained.

In the case where a material other than a lithium foil is used for the negative electrode active material layer 104, the negative electrode active material layer 104 can be manufactured in a manner similar to that of the positive electrode active material layer 143. For example, when silicon is used as the negative electrode active material layer 104, a material obtained by depositing microcrystalline silicon and then removing amorphous silicon from the microcrystalline silicon by etching may be used. When amorphous silicon is removed from microcrystalline silicon, the surface area of the remaining microcrystalline silicon is increased. A chemical vapor deposition method or a physical vapor deposition method can be used as the deposition method of the microcrystalline silicon. For example, a plasma CVD method can be used as the chemical vapor deposition method and a sputtering method can be used as the physical vapor deposition method. Note that the above described conduction auxiliary agent and the binder can also be used.

The electrolyte 146 and the electrolyte with which the separator 156 is impregnated can be manufactured by mixing electrolyte salt including a carrier ion and any one of the room-temperature ionic liquids described in Embodiment 1. In this embodiment, $Li(CF_3SO_2)_2N$ is used as the electrolyte salt including lithium.

A variety of reactions can be applied to a method for synthesizing the room-temperature ionic liquids described in Embodiment 1. As an example, Synthesis Scheme (S-1) can be employed.

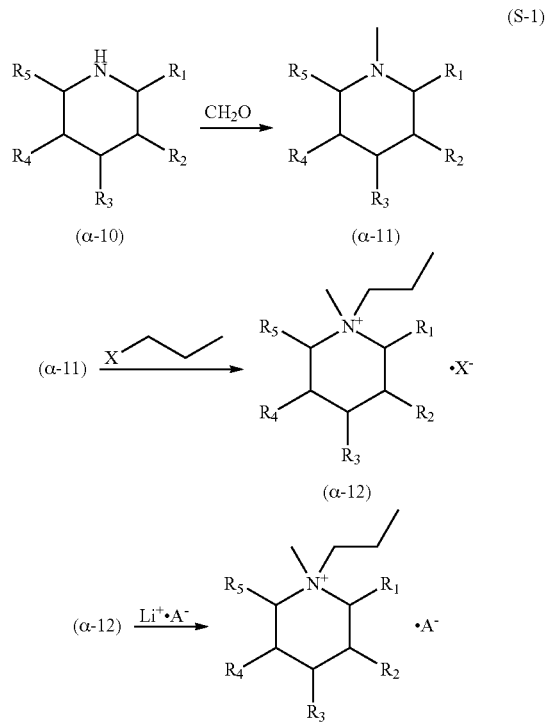

In the above Scheme (S-1), the reaction from a general formula (α-10) to a general formula (α-11) is alkylation of amine by an amine compound and a carbonyl compound in the presence of hydrido. For example, excessive formic acid can be used as the hydrido source. $CH_2O$ is used as the carbonyl compound in the room-temperature ionic liquid of one embodiment of the present invention.

In the above Scheme (S-1), the reaction from the general formula (α-11) to a general formula (α-12) is alkylation by a tertiary amine compound and an alkyl halide compound, which synthesizes quaternary ammonium salt. Propane halide is used as the alkyl halide compound in the room-temperature ionic liquid of one embodiment of the present invention. X is halogen, preferably bromine or iodine, which has high reactivity, more preferably iodine.

Through ion exchange between the quaternary ammonium salt represented by the general formula (α-12) and desired metal salt, the room-temperature ionic liquid of one embodiment of the present invention can be obtained. Lithium metal salt can be used in the Synthesis Scheme (S-1).

Figure 2A:
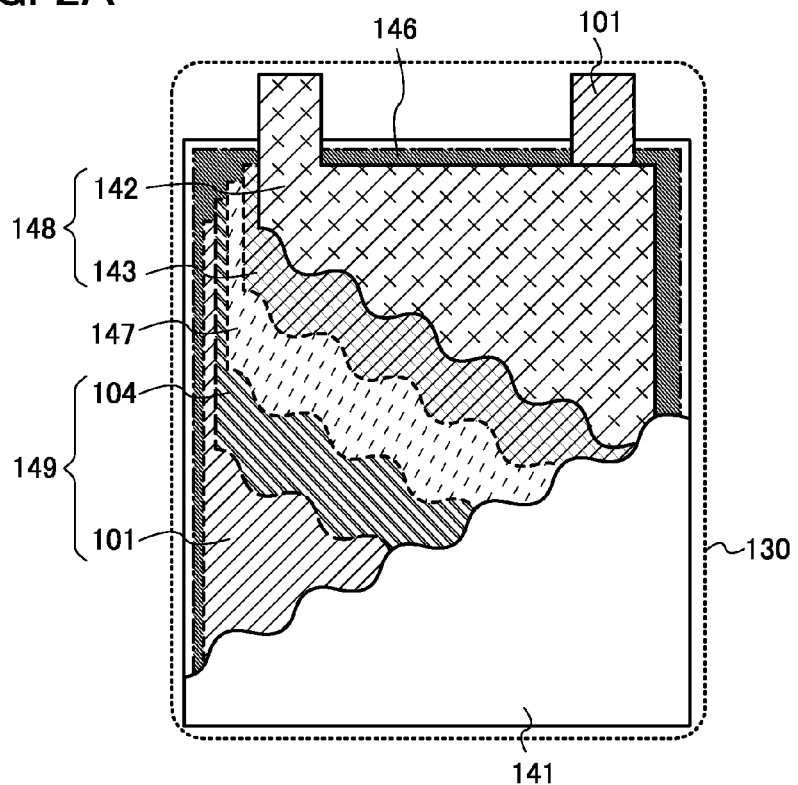
FIG. 2A is a top view of a lithium-ion secondary battery and FIG. 2B is a perspective view of a lithium-ion secondary battery.
Figure 2B:
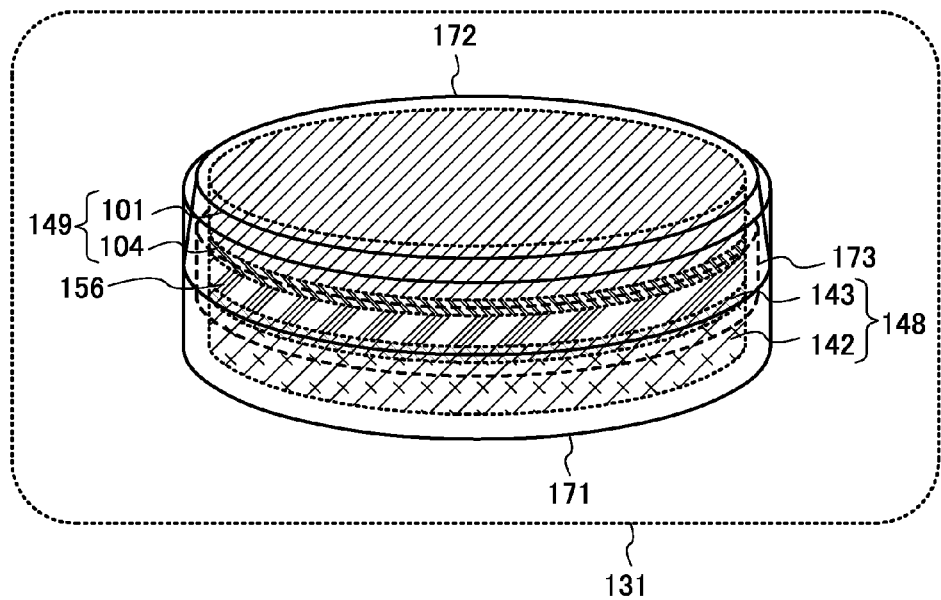
Figure 3A:
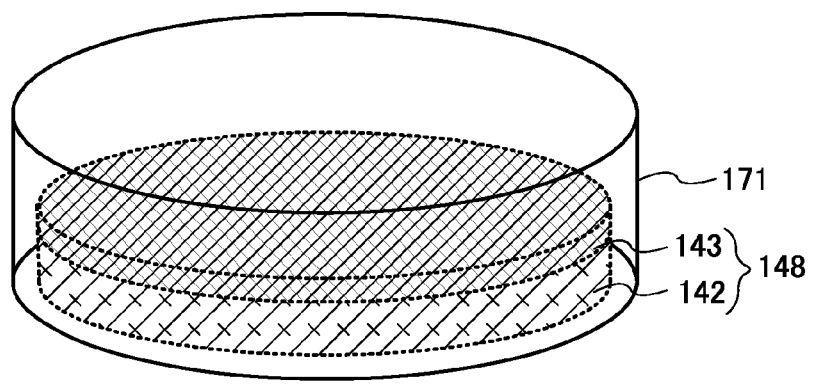
FIGS. 3A and 3B are perspective views showing a manufacturing method of a lithium-ion secondary battery.
Figure 3B:
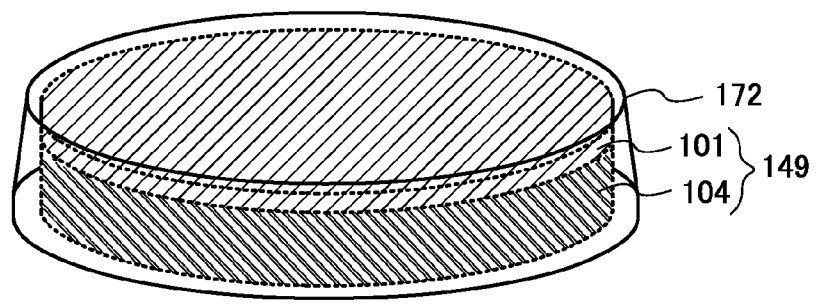
Figure 4:
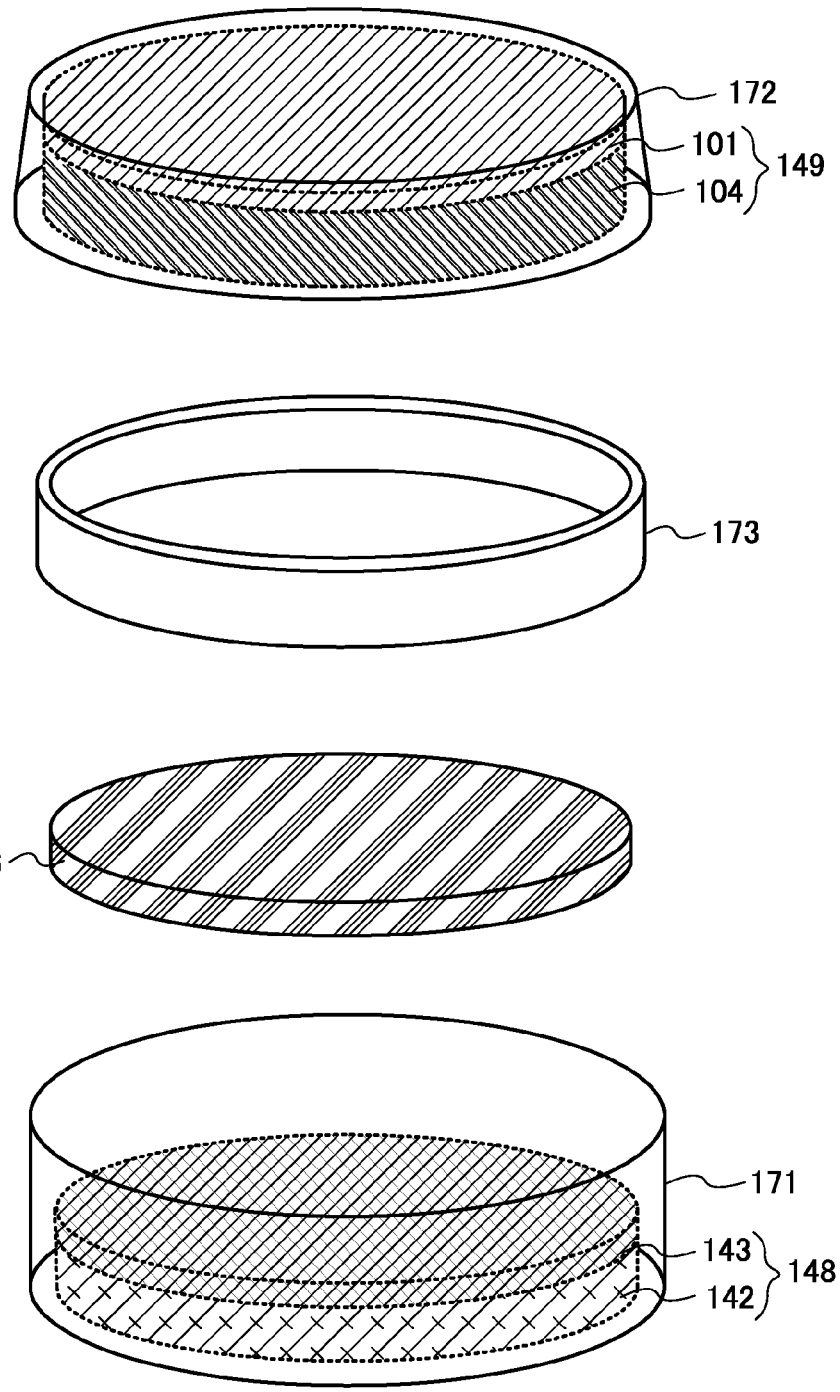
FIG. 4 is a perspective view showing a manufacturing method of the lithium-ion secondary battery.

Next, a top view of a specific structure of the lithium-ion secondary battery 130 in FIG. 1A which is laminated is shown in FIG. 2A. A perspective view of a specific structure of the lithium-ion secondary battery 131 in FIG. 1B which is a button type is shown in FIG. 2B. A method for assembling the button-type lithium-ion secondary battery 131 in FIG. 2B is shown in FIGS. 3A and 3B and FIG. 4.

The laminated lithium-ion secondary battery 130 in FIG. 2A includes the positive electrode 148 including the positive electrode current collector 142 and the positive electrode active material layer 143, and the negative electrode 149 including the negative electrode current collector 101 and the negative electrode active material layer 104, which are described above. The laminated lithium-ion secondary battery 130 in FIG. 2A includes the separator 147 between the positive electrode 148 and the negative electrode 149. In the lithium-ion secondary battery 130, the positive electrode 148, the negative electrode 149, and the separator 147 are placed in the housing 141 and the electrolyte 146 is included in the housing 141.

In FIG. 2A, the negative electrode current collector 101, the negative electrode active material layer 104, the separator 147, the positive electrode active material layer 143, and the positive electrode current collector 142 are arranged in this order from the bottom side. The negative electrode current collector 101, the negative electrode active material layer 104, the separator 147, the positive electrode active material layer 143, and the positive electrode current collector 142 are provided in the housing 141. The housing 141 is filled with the electrolyte 146.

The positive electrode current collector 142 and the negative electrode current collector 101 in FIG. 2A also function as terminals for electrical contact with the outside. For this reason, part of each of the positive electrode current collector 142 and the negative electrode current collector 101 is arranged outside the housing 141 so as to be exposed.

Note that FIG. 2A shows one example of the laminated lithium-ion secondary battery 130 and the laminated lithium-ion secondary battery 130 may have other structures.

The button-type lithium-ion secondary battery 131 in FIG. 2B includes the separator 156 provided between the positive electrode 148 and the negative electrode 149. The separator 156 is impregnated with an electrolyte. The specific structure and the assembling method of the button-type lithium-ion secondary battery 131 in FIG. 2B will be described with reference to FIGS. 3A and 3B and FIG. 4.

First, a first housing 171 is prepared. A bottom surface of the first housing 171 is a circle and the side of the first housing 171 is a rectangle. That is, the first housing 171 is a dish having a columnar shape. It is necessary to use a conductive material for the first housing 171 in order that the positive electrode 148 can be electrically connected to the outside. For example, the first housing 171 may be formed of a metal material. The positive electrode 148 including the positive electrode current collector 142 and the positive electrode active material layer 143 is provided in the first housing 171 (see FIG. 3A).

In addition, a second housing 172 is prepared. A bottom surface of the second housing 172 is a circle and the side of the second housing 172 is a trapezoid in which an upper base is longer than a lower base. That is, the second housing 172 is a dish having a columnar shape. The diameter of the dish is smallest at the bottom and increases upward. Note that the diameter of the second housing 172 is smaller than the diameter of the bottom surface of the first housing 171. The reason is described later.

It is necessary to use a conductive material for the second housing 172 in order that the negative electrode 149 can be electrically connected to the outside. For example, the second housing 172 may be formed of a metal material. The negative electrode 149 including the negative electrode current collector 101 and the negative electrode active material layer 104 is provided in the second housing 172.

A ring-shaped insulator 173 is provided so as to surround the side of the positive electrode 148 provided in the first housing 171. The ring-shaped insulator 173 has a function of insulating the negative electrode 149 and the positive electrode 148 from each other. The ring-shaped insulator 173 is preferably formed using an insulating resin.

The second housing 172 in which the negative electrode 149 is provided shown in FIG. 3B is installed in the first housing 171 in which the ring-shaped insulator 173 is provided, with the separator 156 which is already impregnated with the electrolyte interposed therebetween. The second housing 172 can be fit in the first housing 171 because the diameter of the second housing 172 is smaller than the diameter of the bottom surface of the first housing 171 (see FIG. 4).

As described above, the positive electrode 148 and the negative electrode 149 are insulated from each other by the ring-shaped insulator 173, so that the positive electrode 148 and the negative electrode 149 do not short-circuit.

Note that one example of the button-type lithium-ion secondary battery 131 is shown in FIG. 2B and the button-type lithium-ion secondary battery 131 may have other structures.

In FIG. 2A, an example of the lithium-ion secondary battery 130 in FIG. 1A which is laminated is shown, and in FIGS. 3A and 3B and FIG. 4, an example of the lithium-ion secondary battery 131 in FIG. 2B which is button type is shown; however, structures of the lithium-ion secondary batteries 130 and 131 are not limited to these. The lithium-ion secondary batteries 130 and 131 shown in FIGS. 1A and 1B may have various structures such as a button type, a stack type, a cylinder type, and a laminate type.

As described above, according to this embodiment, a room-temperature ionic liquid having excellent reduction resistance and oxidation resistance is used for an electrolyte of a power storage device; thus, a high-performance power storage device having high energy density and excellent reliability can be obtained.

This embodiment can be implemented in appropriate combination with any of the structures described in the other embodiments.

Embodiment 3

In this embodiment, an application mode of the power storage device described in Embodiment 2 will be described with reference to FIG. 5.

The power storage device described in Embodiment 2 can be used in electronic appliances, e.g., cameras such as digital cameras or video cameras, digital photo frames, mobile phones (also referred to as cellular phones or cellular phone devices), portable game machines, portable information terminals, and audio reproducing devices. Further, the power storage device can be used in electric propulsion vehicles such as electric vehicles, hybrid electric vehicles, train vehicles, maintenance vehicles, carts, and wheelchairs. Here, as a typical example of the electric propulsion vehicles, a wheelchair is described.

Figure 5:
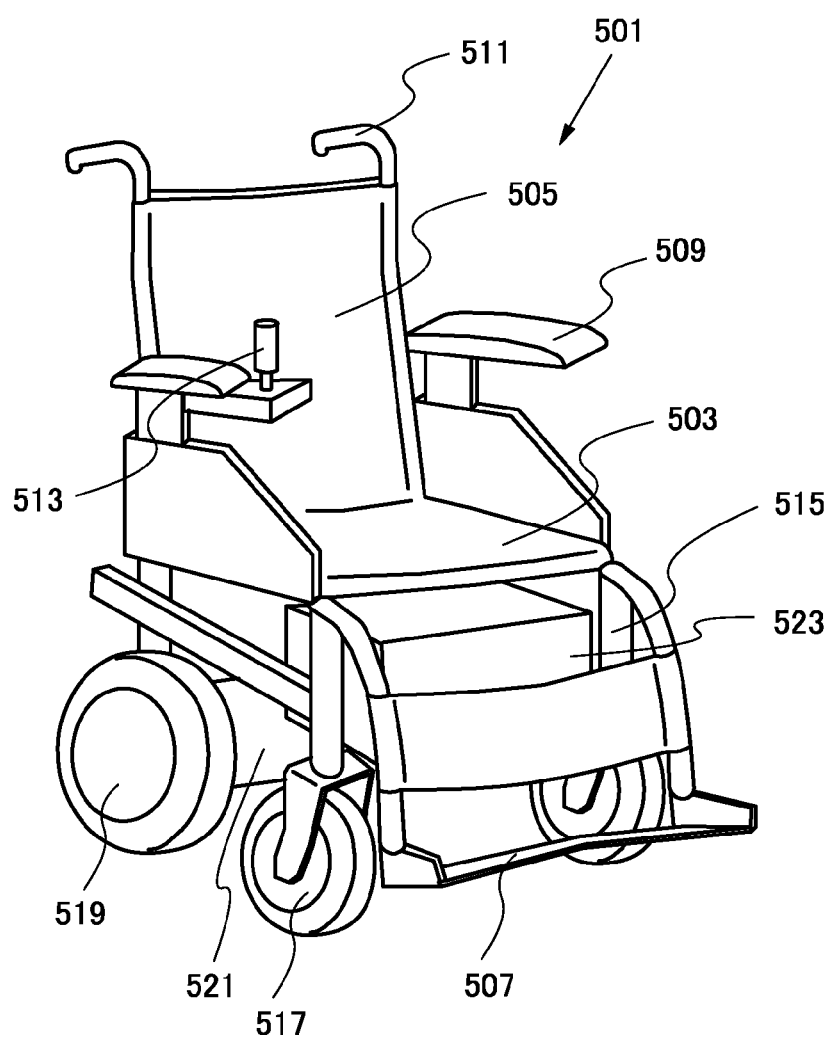
FIG. 5 is a perspective view showing an example of an application mode of a power storage device.

FIG. 5 is a perspective view of an electric wheelchair 501. The electric wheelchair 501 includes a seat 503 where a user sits down, a backrest 505 provided behind the seat 503, a footrest 507 provided at the front of and below the seat 503, armrests 509 provided on the left and right of the seat 503, and a handle 511 provided above and behind the backrest 505. A controller 513 for controlling the operation of the wheelchair is provided for one of the armrests 509. A pair of front wheels 517 is provided at the front of and below the seat 503 through a frame 515 provided below the seat 503. A pair of rear wheels 519 is provided behind and below the seat 503. The rear wheels 519 are connected to a driving portion 521 including a motor, a brake, a gear, and the like. A control portion 523 including a battery, a power controller, a control means, and the like is provided under the seat 503. The control portion 523 is connected to the controller 513 and the driving portion 521. The driving portion 521 is driven through the control portion 523 with the operation of the controller 513 by the user. The control portion 523 controls the operation of moving forward, moving back, turning around, and the like, and the speed of the electric wheelchair 501.

The power storage device described in Embodiment 2 can be used in the battery of the control portion 523. The battery of the control portion 523 can be externally charged by electric power supply using plug-in systems or contactless power feeding. Note that in the case where the electric propulsion vehicle is a train vehicle, the train vehicle can be charged by electric power supply from an overhead cable or a conductor rail.

Example 1

In this example, an example of a method for producing 1,2-dimethyl-1-propylpiperidinium bis(trifluoromethanesulfonyl)imide (abbreviation: 2 mPP13-TFSA) represented by a structural formula (α-13) will be described.

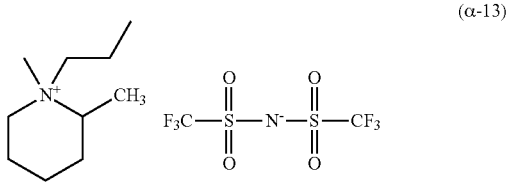

(α-13)

2-Methylpiperidine (1.98 g, 200 mmol) was gradually added to formic acid (15.6 g, 300 mmol) while cooling with water. Next, formaldehyde (22.5 ml, 300 mmol) was added to this solution. This solution was heated to 100° C. and cooled back to room temperature after a bubble generation, and was stirred for about 30 minutes. Then, the solution was heated and refluxed for one hour.

The formic acid was neutralized with sodium carbonate, the solution was extracted with hexane and dried over magnesium sulfate, and the solvent was distilled off, whereby 1,2-dimethylpiperidine (12.82 g, 113 mmol) which was light yellow liquid was obtained.

Bromopropane (20.85 g, 170 mmol) was added to methylene chloride (10 ml) to which the obtained light yellow liquid was added, and was heated and refluxed for 24 hours, so that a white precipitate was generated. After filtration, the remaining substance was recrystallized from ethanol and ethyl acetate and dried under reduced pressure at 80° C. for 24 hours, whereby 1,2-dimethyl-1-propylpiperidinium bromide (11.93 g, 48 mmol) which was a white solid was obtained.

1,2-Dimethyl-1-propylpiperidinium bromide (5.3 g, 22 mmol) and lithium bis(trifluoromethanesulfonyl)imide (7.09 g, 25 mmol) were mixed and stirred in pure water, so that a room-temperature ionic liquid which is insoluble in water was obtained immediately. The obtained room-temperature ionic liquid was extracted with methylene chloride and then washed with pure water six times and dried in vacuum at 100° C.; thus, 1,2-dimethyl-1-propylpiperidinium bis(trifluoromethanesulfonyl)imide (9.37 g, 21 mmol) was obtained.

The compound obtained through the above steps was identified as 1,2-dimethyl-1-propylpiperidinium bis(trifluoromethanesulfonyl)imide which is a target substance by using a nuclear magnetic resonance (NMR) method and mass spectrometry.

$^1$H NMR data of the obtained compound is shown below.

$^1$H-NMR (CDCl$_3$, 400 MHz, 298 K): δ (ppm): 1.00, 1.03, 1.06 (t, 3H), 1.29, 1.34, 1.40 (d, 3H), 1.59-1.88 (m, 8H), 2.85, 2.90, 3.00, 3.07 (s, 3H), 2.85-2.98, 3.20-3.42 (m, 2H), 3.20-3.54 (m, 2H), 3.50-3.54 (m, 1H)

Figure 6A:
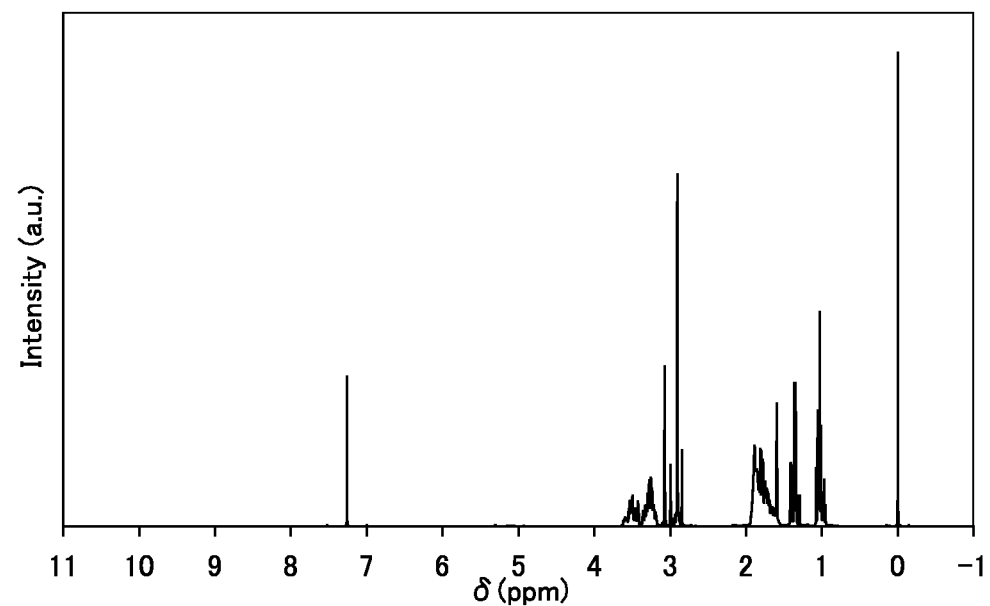
FIGS. 6A and 6B are graphs each showing NMR charts of 1,2-dimethyl-1-propylpiperidinium bis(trifluoromethanesulfonyl)imide.
Figure 6B:
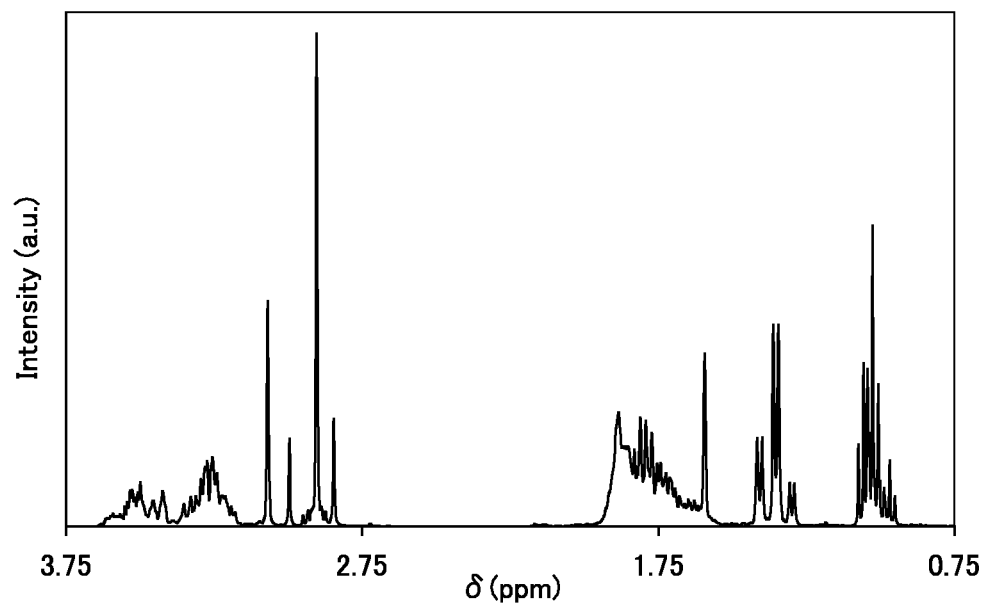

In addition, FIGS. 6A and 6B show $^1$H NMR charts. Note that FIG. 6B is a chart showing an enlargement of FIG. 6A in the range of 0.750 ppm to 3.75 ppm.

The measurement results of the electro spray ionization mass spectrum (ESI-MS) of the obtained compound are shown below.

MS (ESI-MS): m/z=156.2 (M)$^+$; C$_{10}$H$_{22}$N (156.2), 279.98 (M)$^-$; C$_2$F$_6$NO$_4$S$_2$ (280.15)

Example 2

Next, an example of a method for producing 1,3-dimethyl-1-propylpiperidinium bis(trifluoromethanesulfonyl)imide (abbreviation: 3 mPP13-TFSA) represented by a structural formula (α-14) will be described.

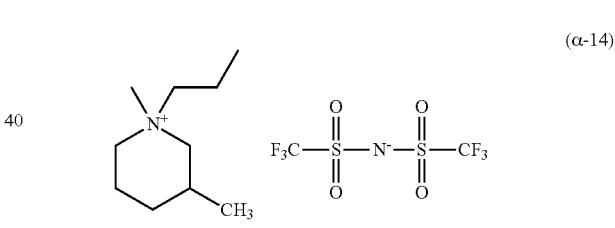

(α-14)

3-Methylpiperidine (1.98 g, 200 mmol) was gradually added to formic acid (15.6 g, 300 mmol) while cooling with water. Next, formaldehyde (22.5 ml, 300 mmol) was added to this solution. This solution was heated to 100° C. and brought back to room temperature after a bubble generation, and was stirred for about 30 minutes. Then, the solution was heated and refluxed for one hour.

The formic acid was neutralized with sodium carbonate, the solution was extracted with hexane and dried over magnesium sulfate, and the solvent was distilled off, whereby 1,3-dimethylpiperidine (12.82 g, 113 mmol) which was light yellow liquid was obtained.

Bromopropane (20.85 g, 170 mmol) was added to methylene chloride (10 ml) to which this light yellow liquid was added, and was heated and refluxed for 24 hours, so that a white precipitate was generated. After filtration, the remaining substance was recrystallized from ethanol and ethyl acetate and dried under reduced pressure at 80° C. for 24 hours, whereby 1,3-dimethyl-1-propylpiperidinium bromide (19.42 g, 82 mmol) which is a white solid was obtained.

1,3-Dimethyl-1-propylpiperidinium bromide (10.60 g, 44 mmol) and lithium bis(trifluoromethanesulfonyl)imide (14.18 g, 50 mmol) were mixed and stirred to be in equimolar amounts in pure water, so that a room-temperature ionic liquid which is insoluble in water was obtained immediately.

The room-temperature ionic liquid was extracted with methylene chloride and then washed with pure water six times and dried in vacuum at 100° C.; thus, 1,3-dimethyl-1-propylpiperidinium bis(trifluoromethanesulfonyl)imide (18.31 g, 42 mmol) was obtained.

The compound obtained through the above steps was identified as 1,3-dimethyl-1-propylpiperidinium bis(trifluoromethanesulfonyl)imide which is a target substance by using a nuclear magnetic resonance (NMR) method and mass spectrometry.

$^1$H NMR data of the obtained compound is shown below.

$^1$H-NMR (CDCl$_3$, 400 MHz, 298 K): δ (ppm) 0.93-1.06 (m, 6H), 1.13-1.23, 1.75-1.95 (m, 2H), 1.60-1.95 (m, 2H), 1.75-1.95 (m, 2H), 1.95-2.12 (m, 1H), 2.72-2.84, 3.30-3.42 (m, 2H), 2.98, 3.01, 3.02, 3.07 (s, 3H), 3.07-3.52 (m, 2H), 3.19-3.28 (m, 2H)

Figure 7A:
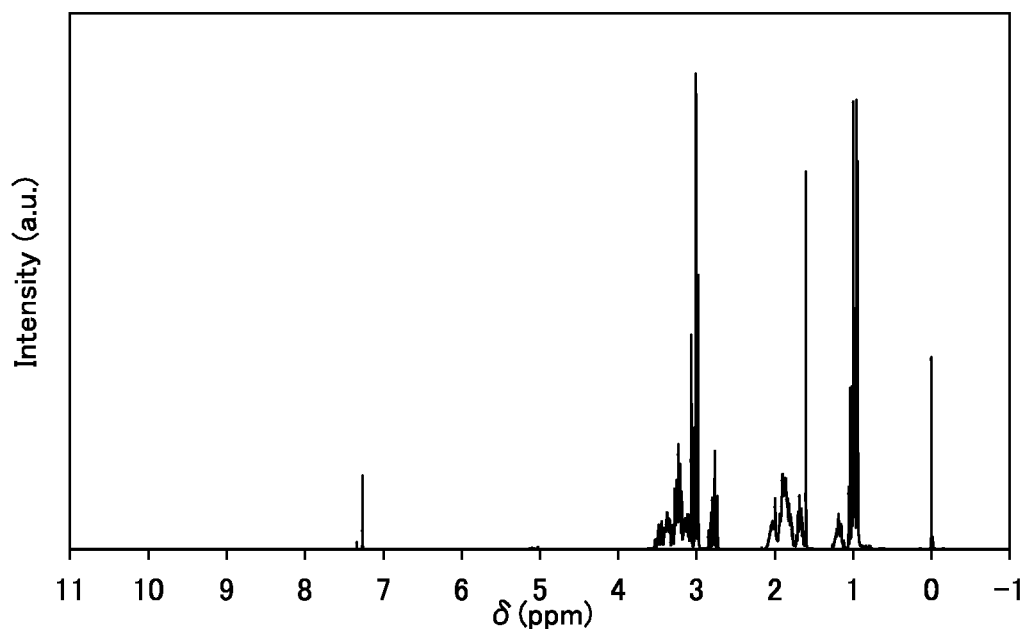
FIGS. 7A and 7B are graphs each showing NMR charts of 1,3-dimethyl-1-propylpiperidinium bis(trifluoromethanesulfonyl)imide.
Figure 7B:
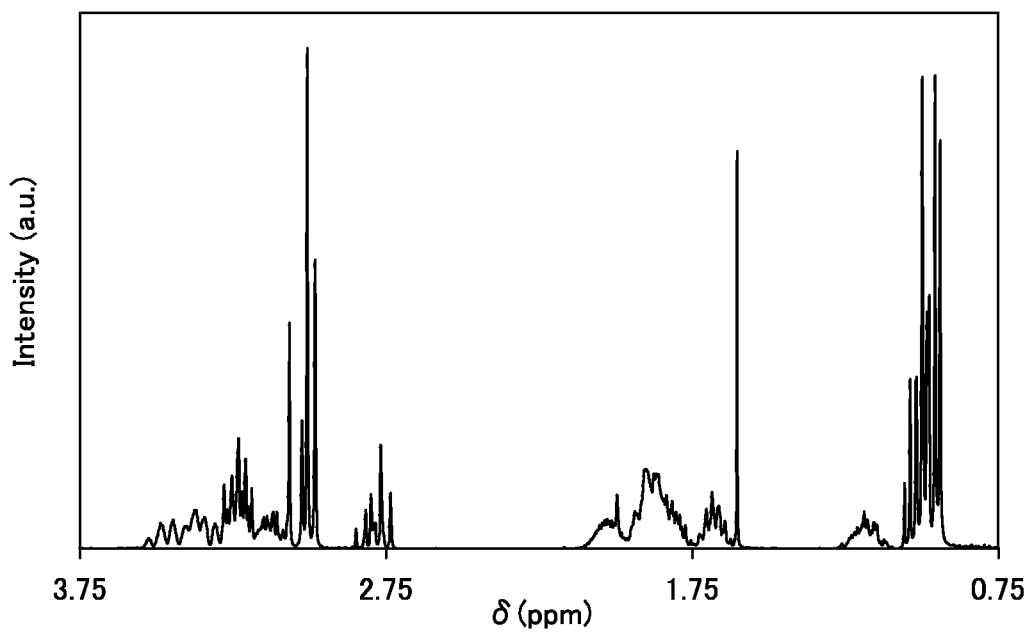

In addition, FIGS. 7A and 7B show $^1$H NMR charts. Note that FIG. 7B is a chart showing an enlargement of FIG. 7A in the range of 0.750 ppm to 3.75 ppm.

The measurement results of the electro spray ionization mass spectrum (ESI-MS) of the obtained compound are shown below.

MS (ESI-MS): m/z=156.2 (M)$^+$; C$_{10}$H$_{22}$N (156.2), 279.98 (M)$^-$; C$_2$F$_6$NO$_4$S$_2$ (280.15)

Example 3

Linear sweep voltammograms of 2 mPP13-TFSA and 3 mPP13-TFSA which are shown in the above Examples were measured and potential windows of the above room-temperature ionic liquid were calculated. N-methyl-N-propylpiperidinium bis(trifluoromethanesulfonyl)imide produced by KANTO CHEMICAL CO., INC. was used as a comparative sample.

The measurement was performed by using electrochemical measurement system HZ-5000 produced by HOKUTO DENKO CORPORATION in a glove box with an argon atmosphere. A glassy carbon electrode was used as a working electrode and a platinum wire was used for an opposite electrode. A silver wire immersed in a solution in which silver trifluoromethanesulfonate was dissolved in 1-ethyl-3-methylimidazolium bis(trifluoromethanesulfonyl)imide at a concentration of 0.1 M was used for a reference electrode. Oxidation-reduction potential of the room-temperature ionic liquid was corrected with reference to the oxidation-reduction potential of ferrocene (Fc/Fc$^+$).

Figure 8:
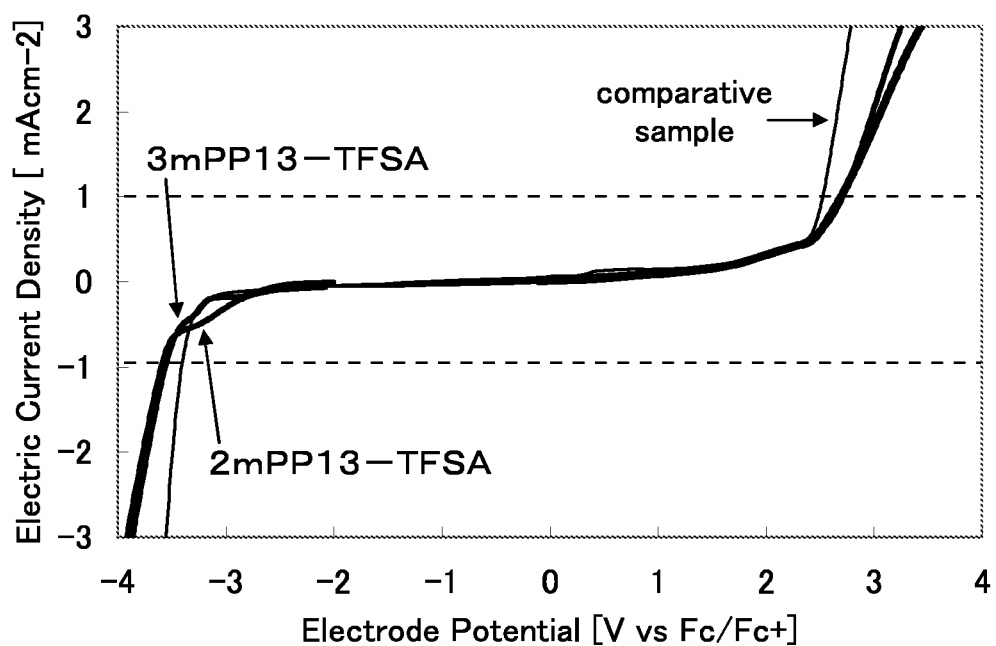
FIG. 8 is a graph showing linear sweep voltammograms of synthesized samples and a comparative sample.

A linear sweep voltammogram of each of 2 mPP13-TFSA, 3 mPP13-TFSA, and the comparative sample is shown in FIG. 8. A "potential window" in this example indicates a difference between an oxidation potential and a reduction potential. In FIG. 8, a potential at which an electric current density of −1 mA/cm$^2$ was detected during the scanning of potentials was calculated as a reduction potential. Further, in FIG. 8, a potential at which an electric current density of 1 mA/cm$^2$ was detected during the scanning of the potentials was calculated as an oxidation potential. The potential window was calculated by subtracting a "reduction potential" from an "oxidation potential".

In FIG. 8, a thin line denotes the comparative sample and thick lines denote 2 mPP13-TFSA and 3 mPP13-TFSA which are embodiments of the present invention. From FIG. 8, the reduction potential of the comparative sample is −3.4 V, the oxidation potential thereof is 2.5 V, and the potential window thereof is 5.9 V. The reduction potential of 2 mPP13-TFSA is −3.6 V, the oxidation potential thereof is 2.7 V, and the potential window thereof is 6.3 V. The reduction potential of 3 mPP13-TFSA is −3.6 V, the oxidation potential thereof is 2.7 V, and the potential window thereof is 6.3 V.

It was confirmed that 2 mPP13-TFSA and 3 mPP13-TFSA which are one embodiment of the present invention each have a lower reduction potential and a higher oxidation potential than those of the comparative sample. Higher reduction resistance was confirmed compared to the comparative sample. That is, stability against a low potential negative electrode of a lithium metal, silicon, tin, or the like was improved by introduction of an electron donating substituent. Further, 2 mPP13-TFSA and 3 mPP13-TFSA which are one embodiment of the present invention each have a higher oxidation potential than that of the comparative sample, whereby the oxidation resistance of 2 mPP13-TFSA and 3 mPP13-TFSA is excellent. Consequently, 2 mPP13-TFSA and 3 mPP13-TFSA each have a wide potential window. As described above, a low potential negative electrode material and a high potential positive electrode material can be selected by using the room-temperature ionic liquid of one embodiment of the present invention for an electrolyte; thus, a power storage device having high energy density can be obtained.

Example 4

Next, an example of a method for producing 1,3-dimethyl-1-propylpiperidinium bis(fluorosulfonyl)imide (abbreviation: 3 mPP13-FSA) represented by a structural formula (α-15) will be described.

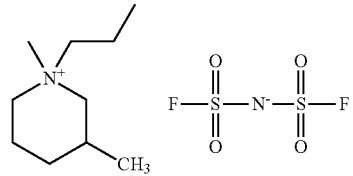

(α-15)

Since steps for obtaining 1,3-dimethyl-1-propylpiperidinium bromide are the same as the steps described in Example 2, the description is omitted here. 1,3-dimethyl-1-propylpiperidinium bromide (17.02 g, 72 mmol) obtained in a manner similar to that in Example 2 and potassium bis(fluorosulfonyl)imide (17.04 g, 78 mmol) were mixed and stirred in pure water, so that a room-temperature ionic liquid which is insoluble in water was obtained immediately.

The room-temperature ionic liquid was extracted with methylene chloride and then washed with pure water six times and dried in vacuum at room temperature through a trap at −80° C.; thus, 1,3-dimethyl-1-propylpiperidinium bis(fluorosulfonyl)imide (20.62 g, 61 mmol) which is a room-temperature ionic liquid was obtained.

The compound obtained through the above steps was identified as 1,3-dimethyl-1-propylpiperidinium bis(fluorosulfonyl)imide which is a target substance by using a nuclear magnetic resonance (NMR) method and mass spectrometry.

$^1$H NMR data of the obtained compound is shown below.

$^1$H-NMR (CDCl$_3$, 400 MHz, 298 K): δ (ppm) 1.02-1.09 (m, 6H), 1.21-1.26, 1.69-1.75 (m, 2H), 1.83-1.91 (m, 2H), 1.94-1.97 (m, 2H), 1.97-2.15 (m, 1H), 2.77-2.87, 3.30-3.43 (m, 2H), 3.05, 3.10 (s, 3H), 3.15-3.54 (m, 2H), 3.25-3.29 (m, 2H)

Figure 9A:
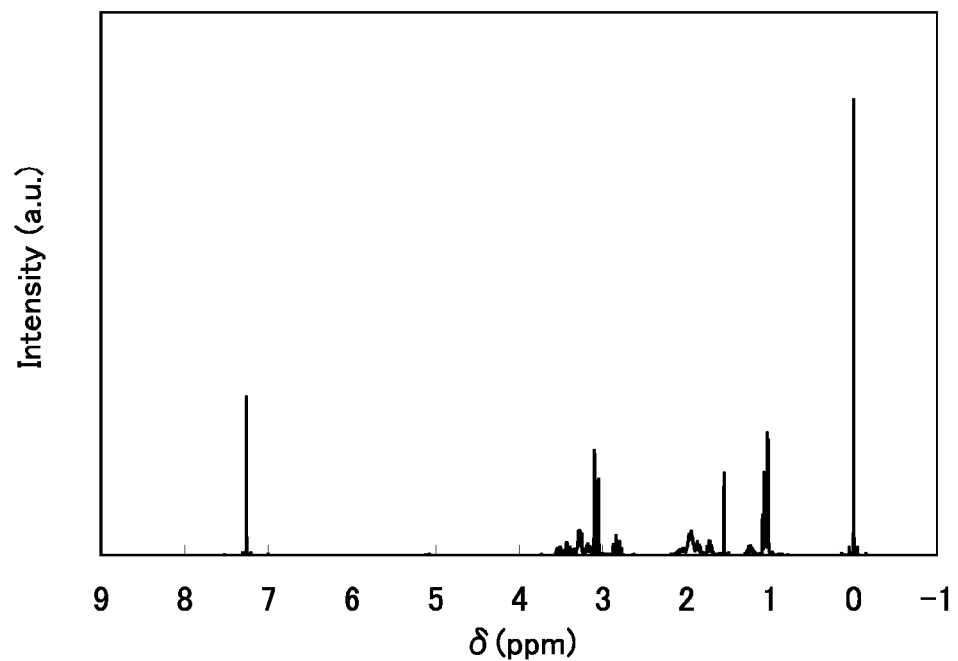
FIGS. 9A and 9B are graphs each showing NMR charts of 1,3-dimethyl-1-propylpiperidinium bis(fluorosulfonyl)imide.
Figure 9B:
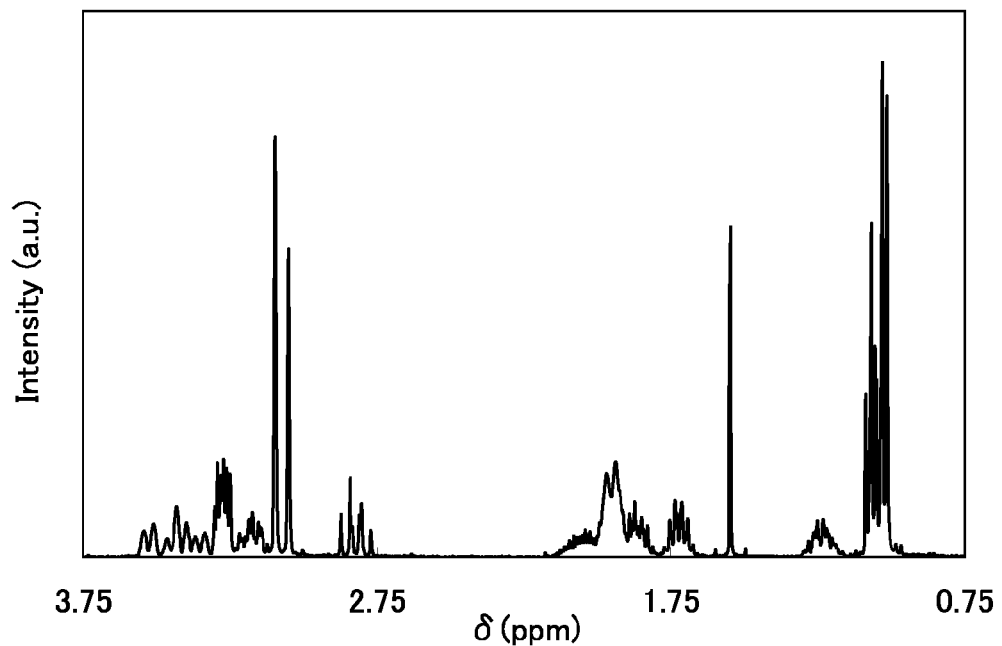

Further, $^1$H-NMR charts are shown in FIGS. 9A and 9B. Note that FIG. 9B is a chart showing an enlargement of FIG. 9A in the range of 0.750 ppm to 3.75 ppm.

The measurement results of the electro spray ionization mass spectrum (ESI-MS) of the obtained compound are shown below.

MS (ESI-MS): m/z=156.2 (M)$^+$; C$_{10}$H$_{22}$N (156.2), 179.98 (M)$^-$; F$_2$NO$_4$S$_2$ (180.13)

Example 5

Next, results of charge and discharge characteristics of a coin-type lithium-ion secondary battery cell using 3 mPP13-FSA in Example 4 for a nonaqueous electrolyte are shown. Note that in this example, a Sample A is the coin-type lithium-ion secondary battery cell using 3 mPP13-FSA for a nonaqueous electrolyte.

First, a method for manufacturing the Sample A will be described with reference to FIG. 10. As a nonaqueous electrolyte of the Sample A, 1.84 g (6.4 mmol) of lithium bis (trifluoromethanesulfonyl)imide (abbreviation: LiTFSA) and 6.81 g (20.0 mmol) of 3 mPP13-FSA were mixed in a glove box with an argon atmosphere.

Commercially available products were used for the positive electrode 148, the negative electrode 149, the ring-shaped insulator 173, and the separator 156, other than the nonaqueous electrolyte, which were in the Sample A. Specifically, an electrode manufactured by Piotrek Co., Ltd. was used as the positive electrode 148. The positive electrode active material layer 143 was formed of lithium cobaltate and the positive electrode current collector 142 was formed of an aluminum foil. The capacitance per weight of the electrode used as the positive electrode 148 is 112 mAh/g. The negative electrode active material layer 104 in the negative electrode 149 was formed of a lithium foil. For the separator 156, GF/C which is a glass fiber filter produced by Whatman Ltd. was used. Then, the positive electrode 148, the negative electrode 149, and the separator 156 were impregnated with the nonaqueous electrolyte. Commercially available objects were used for the housings 171 and 172. The housing 171 electrically connects the positive electrode 148 to the outside and the housing 172 electrically connects the negative electrode 149 to the outside. The housings 171 and 172 were formed of stainless steel (SUS). In addition, a spacer 181 and a washer 183 formed of stainless steel (SUS) were prepared; commercially available objects were used as the spacer 181 and the washer 183.

Figure 10:
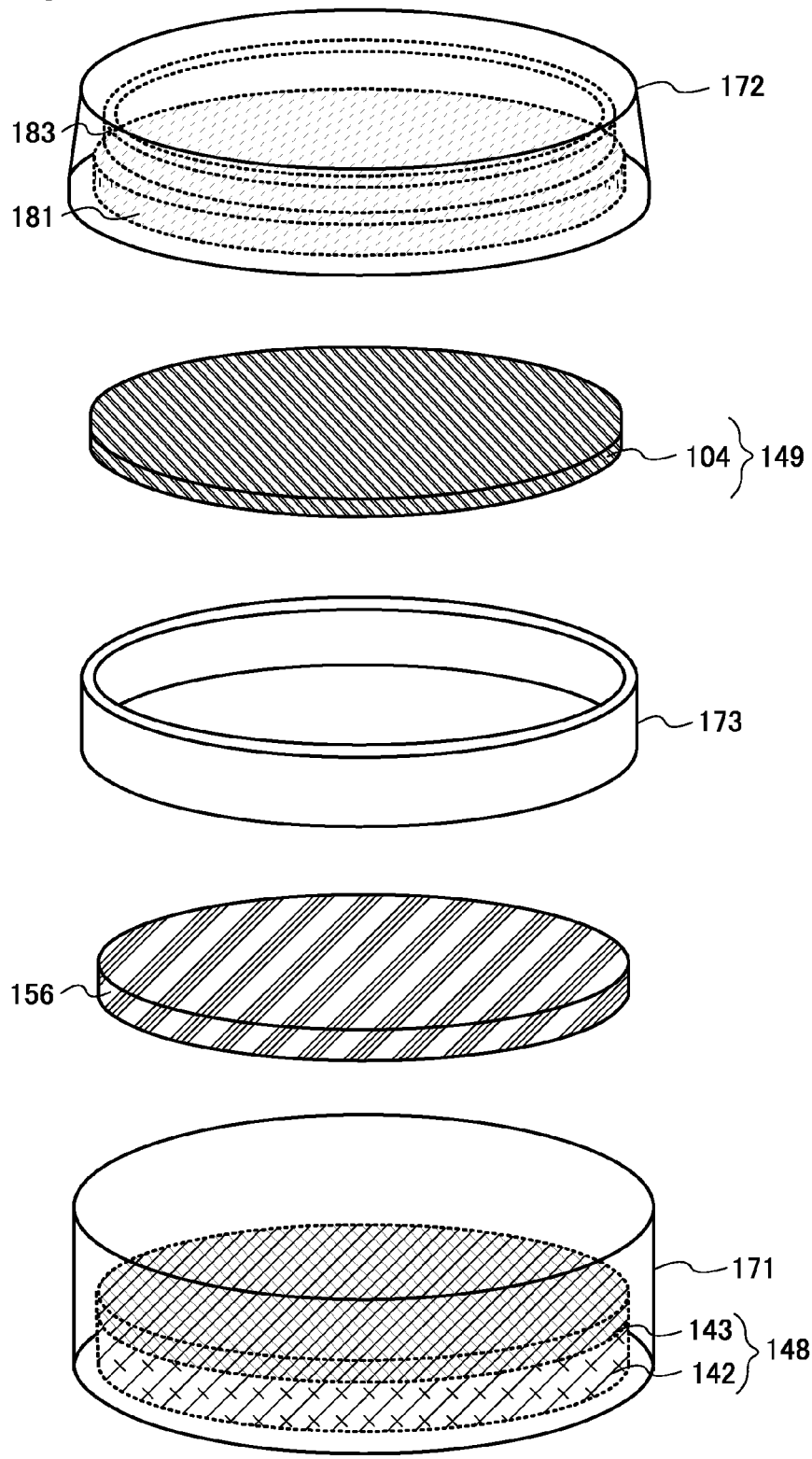
FIG. 10 is a perspective view showing a manufacturing method of a lithium-ion secondary battery.

As shown in FIG. 10, the housing 171, the positive electrode 148, the separator 156, the ring-shaped insulator 173, the negative electrode 149, the spacer 181, the washer 183, and the housing 172 were stacked in this order from the bottom side. The positive electrode 148, the negative electrode 149 and the separator 156 were impregnated with the nonaqueous electrolyte. Then, the housing 171 and the housing 172 were crimped to each other with a "coin cell crimper". Thus, the Sample A was manufactured.

Next, a coin-type lithium-ion secondary battery cell for comparison (Sample B) was manufactured in a manner similar to that of the Sample A (see FIG. 10). Note that the difference between the Sample A and the Sample B is components of nonaqueous electrolytes. For a nonaqueous electrolyte of the Sample B, LiTFSA and N-methyl-N-propylpiperidinium bis(fluoromethanesulfonyl)imide (abbreviation: PP13-FSA) were used. Specifically, 2.82 g (9.8 mmol) of LiTFSA and 10.02 g (31.0 mmol) of PP13-FSA were mixed in a glove box with an argon atmosphere.

The charge and discharge characteristics of each of the Sample A and the Sample B were measured. The charge and discharge characteristics were measured by using a charge-discharge measuring device (produced by TOYO SYSTEM Co., LTD). For the measurements of charge and discharge, a constant current mode was used. The charge and discharge were performed with a current of 0.15 mA at a rate of 0.1 C. The upper limit voltage was 4.2 V and the lower limit voltage was 2.5 V. Note that charging and discharging were in one cycle. In this embodiment, 50 cycles were performed. The samples were measured at room temperature.

Figure 11:
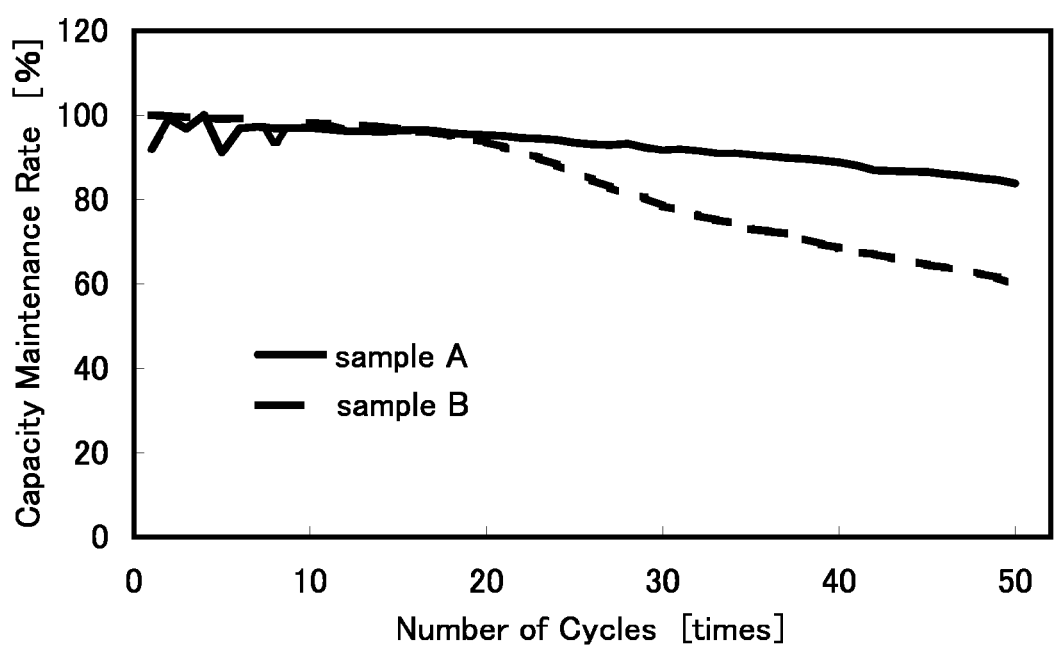
FIG. 11 is a graph showing charge and discharge characteristics of a manufactured lithium-ion secondary battery.

The cycle characteristics of each of the Samples A and B which were measured are shown in FIG. 11. The horizontal axis of FIG. 11 indicates the number of cycles. The vertical axis of FIG. 11 indicates a capacity maintenance rate of the coin-type lithium-ion secondary batteries. Note that the capacity maintenance rate refers to a percentage of a capacitance after certain cycles to the highest capacitance during 50 cycles. A solid line in FIG. 11 shows the charge and discharge characteristics of the Sample A. A dotted line in FIG. 11 is the charge and discharge characteristics of the Sample B. From FIG. 11, it was confirmed that the Sample A is less likely to deteriorate because the capacity maintenance rate after 50 cycles is high.

As described above, when a room-temperature ionic liquid having excellent reduction resistance is used for a nonaqueous electrolyte, a high-performance power storage device having excellent charge and discharge characteristics can be obtained.

This application is based on Japanese Patent Application serial no. 2010-149169 filed with Japan Patent Office on Jun. 30, 2010, the entire contents of which are hereby incorporated by reference.

What is claimed is:
1. A power storage device comprising:
a positive electrode;
a negative electrode;
a separator;
an electrolyte salt; and
a room-temperature ionic liquid represented by a general formula (G1)

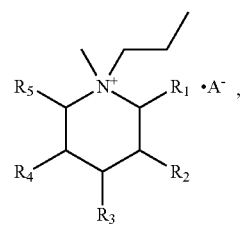

(G1)

wherein R$_2$ represents an alkyl group having 1 or 2 carbon atoms,
wherein one of R$_1$, R$_3$ to R$_5$ represents an alkyl group having 1 or 2 carbon atoms,
wherein the other two of R$_1$, and R$_3$ to R$_5$ represent hydrogen atoms,
wherein A$^-$ represents a univalent imide anion selected from (C$_n$F$_{2n+1}$SO$_2$)$_2$N$^-$ (n=0 to 4), (C$_m$F$_{2m+1}$SO$_3$)$^-$ (m=0 to 4), and CF$_2$(CF$_2$SO$_2$)$_2$N$^-$
and
wherein the electrolyte salt includes a lithium ion.
2. The power storage device according to claim 1, wherein the power storage device is a lithium-ion secondary battery.

3. The power storage device according to claim 1, wherein the power storage device is a lithium-ion capacitor.

4. The power storage device according to claim 1, wherein the $A^-$ is $(FSO_2)_2N^-$ or $(CF_3SO_2)_2N^-$.

5. A power storage device comprising:
a positive electrode;
a negative electrode;
a separator;
an electrolyte salt; and
a room-temperature ionic liquid represented by a general formula (G2)

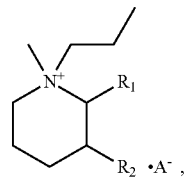

(G2)

wherein $R_1$ represents an alkyl group having 1 or 2 carbon atoms,
wherein $R_2$ represents a hydrogen atom,
wherein $A^-$ represents a univalent imide anion selected from $(C_nF_{2n+1}SO_2)_2N^-$ (n=0 to 4), $(C_mF_{2m+1}SO_3)^-$ (m=0 to 4), and $CF_2(CF_2SO_2)_2N^-$ and
wherein the electrolyte salt includes a lithium ion.

6. The power storage device according to claim 5, wherein the power storage device is a lithium-ion secondary battery.

7. The power storage device according to claim 5, wherein the power storage device is a lithium-ion capacitor.

8. The power storage device according to claim 5, wherein the $A^-$ is $(FSO_2)_2N^-$ or $(CF_3SO_2)_2N^-$.

9. A power storage device comprising:
a positive electrode;
a negative electrode;
a separator;
an electrolyte salt; and
a room-temperature ionic liquid represented by a general formula (G3)

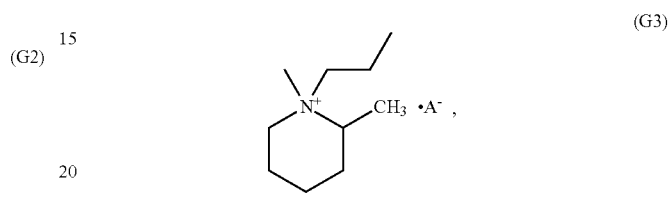

wherein $A^-$ represents a univalent imide anion selected from $(C_nF_{2n+1}SO_2)_2N^-$ (n=0 to 4), $(C_mF_{2m+1}SO_3)^-$ (m=0 to 4), and $CF_2(CF_2SO_2)_2N^-$ and
wherein the electrolyte salt includes a lithium ion.

10. The power storage device according to claim 9, wherein the power storage device is a lithium-ion secondary battery.

11. The power storage device according to claim 9, wherein the power storage device is a lithium-ion capacitor.

12. The power storage device according to claim 9, wherein the $A^-$ is $(FSO_2)_2N^-$ or $(CF_3SO_2)_2N^-$.

* * * * *